(12) United States Patent
Hsu

(10) Patent No.: US 7,777,801 B2
(45) Date of Patent: Aug. 17, 2010

(54) METHOD FOR EVALUATING EFFECTIVE SAMPLING STEPS OF AUTO FOCUS

(75) Inventor: Wei Hsu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 1076 days.

(21) Appl. No.: 11/456,006

(22) Filed: Jul. 6, 2006

(65) Prior Publication Data

US 2007/0253691 A1    Nov. 1, 2007

(30) Foreign Application Priority Data

Apr. 28, 2006    (TW) .............................. 95115223 A

(51) Int. Cl.
*H04N 5/232* (2006.01)
*G03B 13/00* (2006.01)

(52) U.S. Cl. ........................................ 348/345; 348/180

(58) Field of Classification Search ................. 348/180, 348/187, 188, 345
See application file for complete search history.

(56) References Cited

U.S. PATENT DOCUMENTS 7,432,975 B2 * 10/2008 Lee ............................. 348/349
2007/0110425 A1 * 5/2007 Lin et al. ..................... 396/133

* cited by examiner

*Primary Examiner*—Lin Ye
*Assistant Examiner*—Gevell Selby
(74) *Attorney, Agent, or Firm*—Apex Juris, pllc; Tracey M. Heims

(57) ABSTRACT

A method of evaluating effective sampling steps of auto focus is provided. By utilizing the depth-of-field feature, many sampling steps are ignored and some representative steps in the depth-of-field range are used as the effective sampling steps. Since the sampling steps are minimized, the search time is largely reduced without deteriorating the search effectiveness.

5 Claims, 3 Drawing Sheets

METHOD FOR EVALUATING EFFECTIVE SAMPLING STEPS OF AUTO FOCUS

FIELD OF THE INVENTION

The present invention relates to a method for evaluating effective sampling steps of auto focus, and more particularly to a method for evaluating effective sampling steps of auto focus for an image pickup device.

BACKGROUND OF THE INVENTION

Currently, image pickup devices such as digital cameras and camera phones are widely used to take photographs. As known, the definition of the object taken by the image pickup device is largely effected by the focusing operation of the image pickup device. In order to achieve high image quality of the object, the focal length should be properly adjusted to focus on the object. In other words, the quality of the digital camera or the camera phone is highly dependent on the auto focus method applied to the digital camera.

Generally, the auto focus methods are classified into two types, i.e. an active auto focus method and a passive auto focus method. Since the active auto focus method needs extra detector and beam projector, the cost of the digital camera is increased and thus the passive auto focus method is more popular.

The steps for implementing the passive auto focus method are illustrated with reference of the flowchart of FIG. 1. In accordance with the passive auto focus method, the lens of the camera is moved to different focusing positions in different lens positions or steps (i.e. sampling steps), and the focus values at different positions are analyzed in order to discriminate whether the image is sharp or not. The lens position's sharpness value is also called the focus value. First of all, the lens of the digital camera is firstly moved to a first position and the image data at this position is captured (Step 101). Then, the focus value of the image is calculated (Step 102). If this focus value is the maximum focus value (Step 103), the auto focus (AF) process is finished. Otherwise, the lens is moved to the next position (Step 104), and the steps 101, 102 and 103 are repeated until the maximum focus value is searched.

From the flowchart of FIG. 1, the passive auto focus method includes two parts, i.e. the focus value measurement and the lens position search algorithm.

Conventionally, there are several means for implementing focus value measurements such as global search algorithm, hill-climbing search algorithm, binary search algorithm and ruled-based search algorithm. These focus value measurements are well known to those skilled in the art, and are not intended to describe redundantly herein. Typically, search time, number of the lens movement steps and search accuracy are all very important for the lens position search algorithm. Generally, longer search time means lower auto focus efficiency, and more lens movement steps consume more power of the camera because each movement step needs power. Whereas, too short search time or insufficient movement steps are detrimental to the searching accuracy.

For example, since the global search algorithm captures image in every lens movement step (or unit sampling step) and determines the position with the maximum focus value, the search result of the global search algorithm is the most correct among these lens position search algorithms. However, the global search algorithm needs too long search time and too many lens movement steps. In addition, the binary search algorithm is faster than the global search algorithm, but the generated image noise is detrimental to determination of the maximum focus value. Moreover, the lens needs to move back and forth to obtain the peak position, which might suffer from mechanical backlash problem and shorten the lifetime of the digital camera. As previously described, these algorithms for implementing focus value measurements have respective advantages and limitations, the selection of the desired algorithm is determined according to the user's requirement.

Moreover, the conventional algorithm for implementing focus value measurements further comprises a fixed focusing position search algorithm. The focus values detected at some fixing focusing positions such as 30 cm, 50 cm, 1 m, 2 m or 3 m are analyzed in order to discriminate whether the image is sharp or not. In such algorithm, the search time is reduced and the power consumption of the digital camera is saved. However, since every lens has respective attributes, the focus values detected at the fixing focusing positions sometimes fail to obtain searching accuracy.

In views of the above-described disadvantages of the prior art, the applicant keeps on carving unflaggingly to develop a method for evaluating effective sampling steps of auto focus according to the present invention through wholehearted experience and research.

SUMMARY OF THE INVENTION

It is an object of the present invention to provide a method for evaluating effective sampling steps of auto focus so as to reduce the search time.

In accordance with an aspect of the present invention, there is provided a method for evaluating effective sampling steps of auto focus to obtain a plurality of effective sampling steps of auto focus for an image pickup device having a lens. The method comprises steps of (a) obtaining a maximum focus value FVa and a lens search step number Sa corresponding to the maximum focus value FVa when a focusing test chart is located at a first testing position; (b) obtaining a first depth-of-field boundary step number Sb at the first testing position according to an blur percentage value TH; (c) searching a second testing position of the focusing test chart corresponding to the first depth-of-field boundary step number Sb, and calculating a maximum focus value FVb when the focusing test chart is located at the second testing position; (d) obtaining a second depth-of-field boundary step number Sc at the second testing position according to the blur percentage value TH; and (e) repeating the steps (c) and (d), wherein the Sa, Sb and Sc are effective sampling steps.

In an embodiment, the image pickup device is a digital camera.

In an embodiment, the image pickup device has an effective in-focus range of from an infinite far location DI to a near location, and the testing positions lie in the effective in-focus range.

In an embodiment, in the step (b), the focus value obtained at the first depth-of-field boundary step number Sb is FV', and the ratio of FV'/FVa is greater than or equal to the blur percentage value TH.

In an embodiment, in the step (d), the focus value obtained at the second depth-of-field boundary step number Sc is FV", and the ratio of FV"/FVb is greater than or equal to the blur percentage value TH.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention relates to a method for evaluating effective sampling steps of auto focus by using the depth-of-field feature of the image pickup device such as a digital camera, thereby reducing the search time of auto focus.

Figure 1:
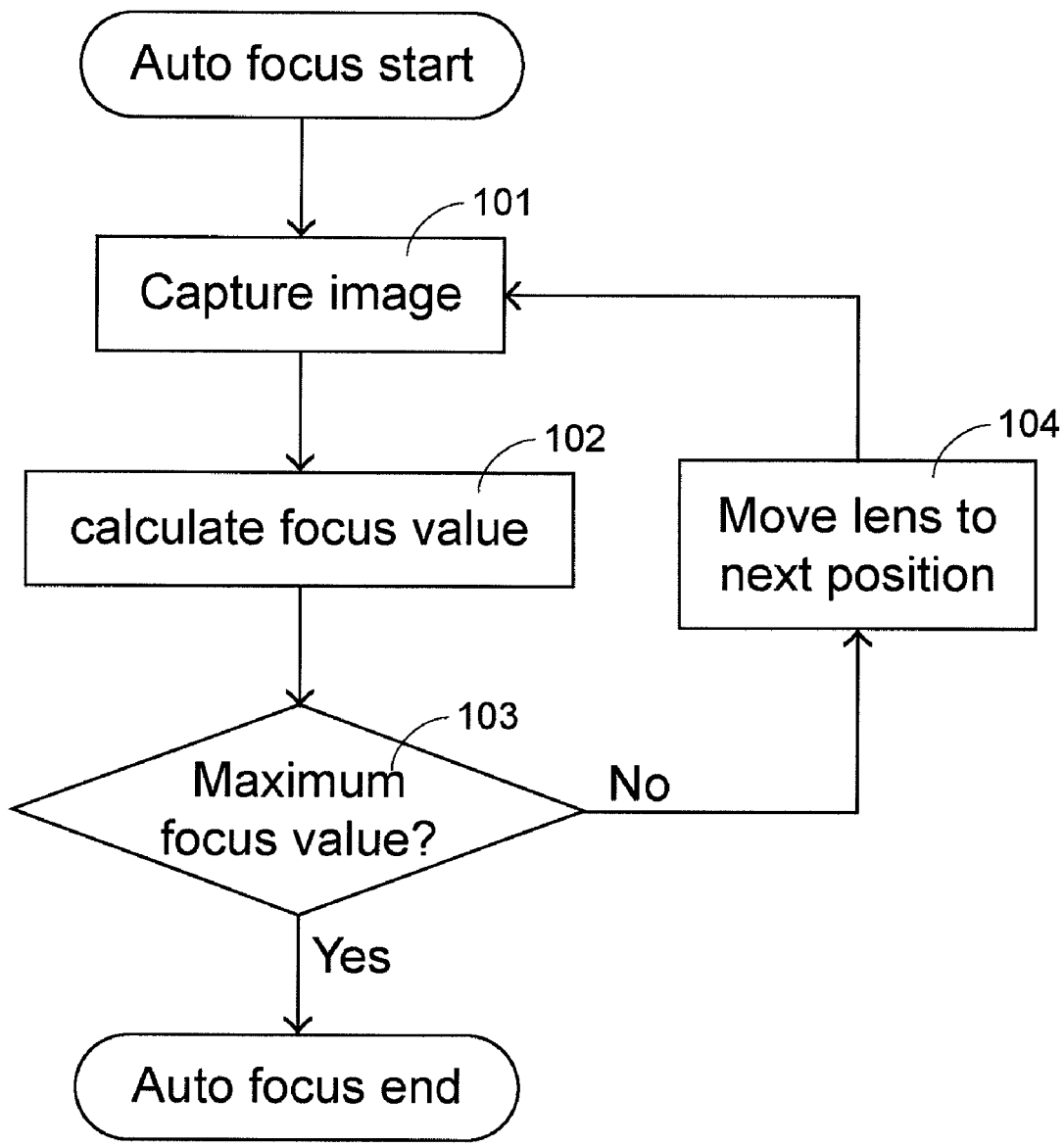
FIG. 1 is a flowchart illustrating the steps of implementing a passive auto focus method.
Figure 2:
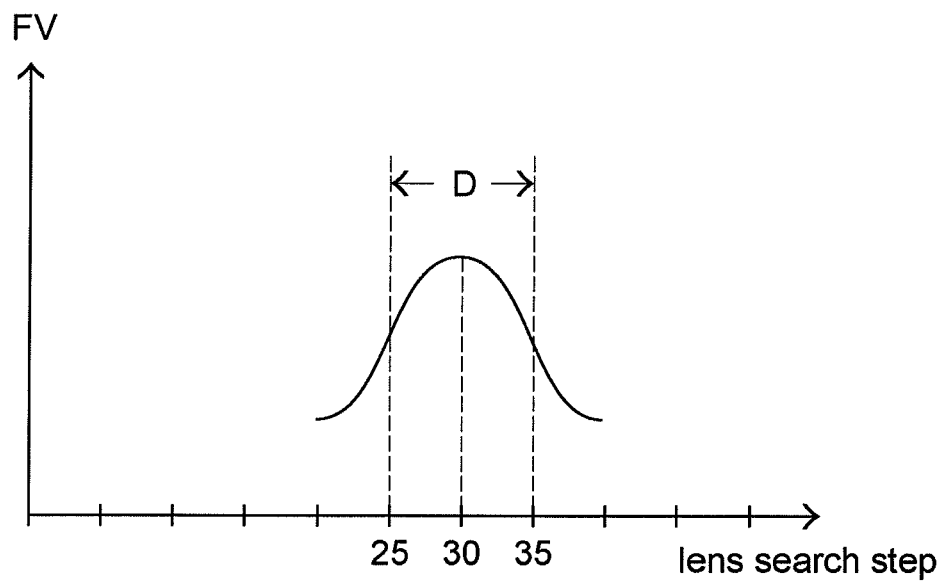
FIG. 2 is a typical curve plot illustrating the relation between lens search steps versus focus values.

FIG. 2 is a typical curve plot illustrating the relation between lens search steps versus focus values (FVs). In FIG. 2, the vertical axle indicates the moving steps of the lens, and the horizontal axle indicates the corresponding focus values. For example, as shown in FIG. 2, the maximum focus value is obtained when the lens has moved for 30 steps. Due to the depth of focus for the optical element, the focus values within the depth-of-field range, i.e. zone D of from the 25th step to the 35th step, are acceptable. Under this circumstance, sharp images are obtained. As previously described, since there is a total of 11 steps in the zone D, the lens needs to move for 11 steps to determine the position with the maximum focus value according to the conventional global search algorithm. By utilizing the depth-of-field feature, only one moving step is required to determine the maximum focus value within the depth-of-field range.

Figure 3:
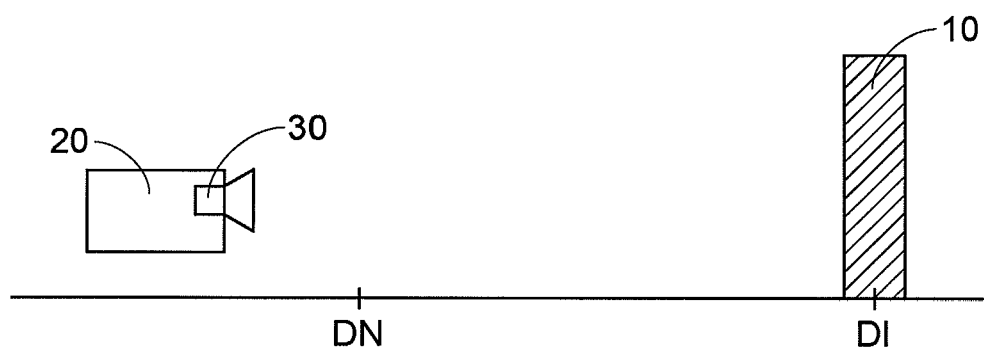
FIG. 3 is a schematic diagram illustrating the relative location of a focusing test chart and an image pickup device.

Please refer to FIG. 3, which is a schematic diagram illustrating the relative location of a focusing test chart and an image pickup device. As shown in FIG. 3, the image pickup device 20 has a lens 30. By adjusting the distance between the lens 30 and the focusing test chart 10, an in-focus range of from an infinite far location DI to a near location DI is defined. Within the in-focus range, the image pickup device 20 is moved according to the method of the present invention to evaluate effective sampling steps on the focusing test chart 10.

Figure 4A:
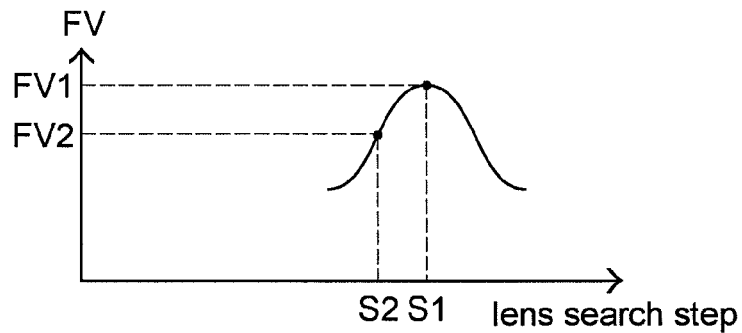
FIGS. 4(a), 4(b) and 4(c) are threes curve plots illustrating the relations between lens search step numbers versus focus values at different objective distances.
Figure 4B:
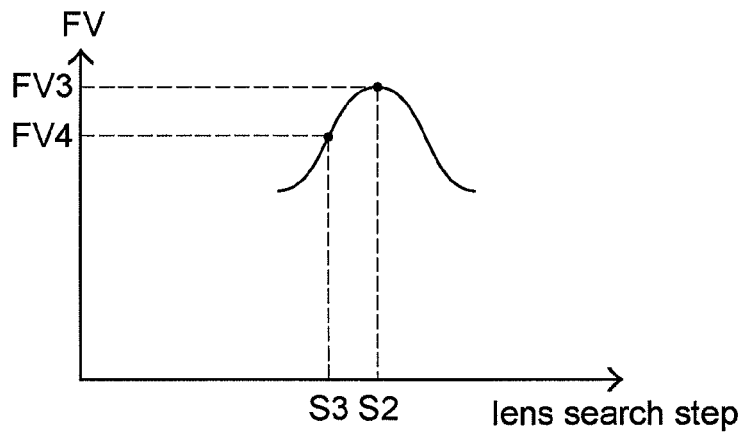
Figure 4C:
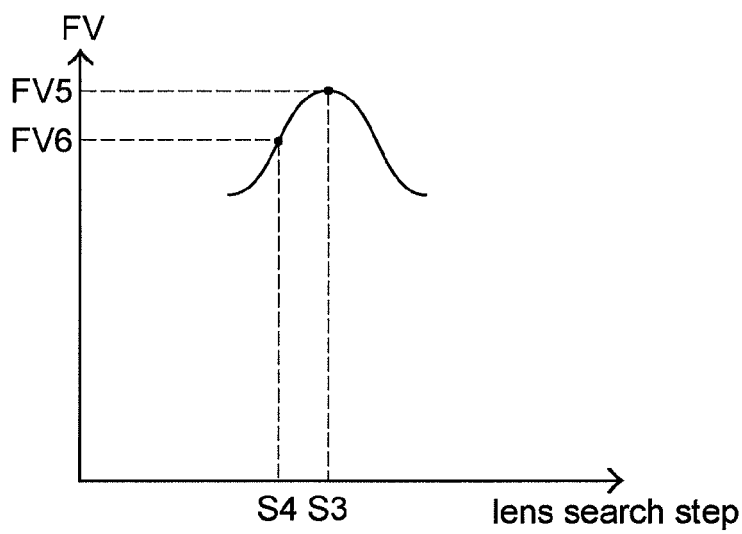

Referring to FIGS. 4(a), 4(b) and 4(c), threes curve plots illustrating the relations between lens search step numbers versus focus values at different objective distances are illustrated. In these drawings, the vertical axle indicates the moving steps of the lens, and the horizontal axle indicates the corresponding focus values. The process of implementing the method for evaluating sampling steps of auto focus according to the present invention will be illustrated with reference to FIGS. 4(a), 4(b) and 4(c) and in more details as follows.

The curve plots shown in FIGS. 4(a), 4(b) and 4(c) are obtained when the object to be focused are positioned at the objective distances of A, B and C, respectively. For obtaining the curve plot as shown in FIG. 4(a), the focusing test chart 10 is firstly positioned at the objective distance of A. Then, the focusing test chart 10 is moved from an infinite far location DI to a near location relative to the image pickup device 20. According to the conventional global search algorithm, the maximum focus value FV1 and the lens search step number S1 are determined at the objective distance of A. Then, the lens 30 is successively moved forwardly to the next positions and the focus values corresponding to these positions are detected. For example, the lens 30 is successively moved forwardly to the next positions S1.1, S1.2, S1.3, S1.4 and S2, and the detected focus values are FV1.1, FV1.2, FV1.3, FV1.4 and FV2, respectively.

In accordance with the present invention, an blur percentage value TH, for example 0.94, has been predetermined. The blur percentage value TH indicates the depth-of-focus boundary at a specified testing position, and is determined according to some factors such as the imaging characteristics of the image pickup device, the characteristics of the optical lens, the sharpness function, etc.

In a case that the ratio of the focus value obtained at a certain current lens search step number to the maximum focus value FV1, i.e. FV1.1/FV1, FV1.2/FV1, FV1.3/FV1, FV1.4/FV1 or FV2/FV1, is greater than the blur percentage value TH, the focus value obtained at such lens search step number lies in the depth-of-field range. On the contrary, if the ratio FV1.1/FV1, FV1.2/FV1, FV1.3/FV1, FV1.4/FV1 or FV2/FV1 is less than the blur percentage value TH, the focus value obtained at such lens search step number is out of the depth-of-field range. As a consequence, the depth-of-focus boundary at the testing position A is determined when the ratio of the focus value obtained at a certain current lens search step number to the maximum focus value FV1 is greater than or equal to the blur percentage value TH. For example, as shown in FIG. 4(a), the depth-of-focus boundary is obtained when the lens search step number is S2.

For obtaining the curve plot as shown in FIG. 4(b), the focusing test chart 10 is then moved such that the objective distance is B. According to the conventional global search algorithm, the maximum focus value FV3 and the depth-of-focus boundary is obtained when the lens search step number is S3. Likewise, the ratio of the focus value FV4 obtained at the lens search step number S3 to the maximum focus value FV3, i.e. FV4/FV3, is greater than or equal to the blur percentage value TH.

For obtaining the curve plot as shown in FIG. 4(c), the focusing test chart 10 is then moved such that the objective distance is C. According to the conventional global search algorithm, the maximum focus value FV5 and the depth-of-focus boundary is obtained when the lens search step number is S4. Likewise, the ratio of the focus value FV6 obtained at the lens search step number S4 to the maximum focus value FV5, i.e. FV6/FV5, is greater than or equal to the blur percentage value TH.

The rest may be deduced by analogy. When the focusing test chart 10 is moved from the infinite far location DI to the near location, the effective sampling steps S1, S2, S3, S4 . . . , etc. are obtained according to the evaluating method of the present invention.

After the effective sampling steps are evaluated, the image pickup device 20 will only search these effective sampling steps when the auto focus method is implemented, so that the search time is largely reduced.

From the above description, according to the feature of the depth of field, many sampling steps within the depth-of-field are ignored. In stead, only the lens search steps with larger sharpness are used for implementing auto focus. Since the sampling steps are minimized, the search time is largely reduced without deteriorating the search effectiveness.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for evaluating effective sampling steps of auto focus to obtain a plurality of effective sampling steps of auto focus for an image pickup device, said image pickup device having a lens, said method comprising steps of:
   (a) obtaining a maximum focus value FVa and a lens search step number Sa corresponding to the maximum focus value FVa when a focusing test chart is located at a first testing position;
   (b) obtaining a first depth-of-field boundary step number Sb at said first testing position according to an blur percentage value TH;
   (c) searching a second testing position of said focusing test chart corresponding to said first depth-of-field boundary step number Sb, and calculating a maximum focus value FVb when said focusing test chart is located at said second testing position;
   (d) obtaining a second depth-of-field boundary step number Sc at said second testing position according to said blur percentage value TH; and
   (e) repeating the steps (c) and (d), wherein said Sa, Sb and Sc are effective sampling steps.

2. The method for evaluating effective sampling steps of auto focus according to claim 1 wherein said image pickup device is a digital camera.

3. The method for evaluating effective sampling steps of auto focus according to claim 1 wherein said image pickup device has an effective in-focus range of from an infinite far location DI to a near location, and said testing positions lie in said effective in-focus range.

4. The method for evaluating effective sampling steps of auto focus according to claim 1 wherein in the step (b), the focus value obtained at said first depth-of-field boundary step number Sb is FV', and the ratio of FV'/FVa is greater than or equal to said blur percentage value TH.

5. The method for evaluating effective sampling steps of auto focus according to claim 1 wherein in the step (d), the focus value obtained at said second depth-of-field boundary step number Sc is FV", and the ratio of FV"/FVb is greater than or equal to said blur percentage value TH.

* * * * *